US012198829B2

(12) United States Patent
Fujii

(10) Patent No.: US 12,198,829 B2
(45) Date of Patent: Jan. 14, 2025

(54) SILVER POWDER AND METHOD FOR PRODUCING SAME

(71) Applicant: DOWA ELECTRONICS MATERIALS CO., LTD., Tokyo (JP)

(72) Inventor: Masanori Fujii, Tokyo (JP)

(73) Assignee: DOWA ELECTRONICS MATERIALS CO., LTD., Tokyo (JP)

(*) Notice: Subject to any disclaimer, the term of this patent is extended or adjusted under 35 U.S.C. 154(b) by 392 days.

(21) Appl. No.: 17/622,275

(22) PCT Filed: Jun. 20, 2020

(86) PCT No.: PCT/JP2020/023615
§ 371 (c)(1),
(2) Date: Dec. 23, 2021

(87) PCT Pub. No.: WO2020/262119
PCT Pub. Date: Dec. 30, 2020

(65) Prior Publication Data
US 2022/0258230 A1 Aug. 18, 2022

(30) Foreign Application Priority Data
Jun. 27, 2019 (JP) ................................. 2019-119934

(51) Int. Cl.
H01B 1/22 (2006.01)
B22F 1/00 (2022.01)
(Continued)

(52) U.S. Cl.
CPC ................. H01B 1/22 (2013.01); B22F 1/00 (2013.01); B22F 1/052 (2022.01); B22F 1/056 (2022.01);
(Continued)

(58) Field of Classification Search
None
See application file for complete search history.

(56) References Cited

FOREIGN PATENT DOCUMENTS

JP 2007194581 A 8/2007
JP 2010070793 A * 4/2010
(Continued)

OTHER PUBLICATIONS

International search report for patent application No. PCT/JP2020/023615 dated Aug. 18, 2020.

Primary Examiner — Daniel J. Schleis
(74) Attorney, Agent, or Firm — Bachman & LaPointe, P.C.

(57) ABSTRACT

There are provided a silver powder, which is able to form an electrically conductive film having a low resistance value even if the period of time for firing an electrically conductive paste is shorter than that for firing conventional electrically conductive pastes when the silver powder is used as the material of the electrically conductive paste, and a method for producing the same. A large-diameter silver powder, which has a crystalline size of 50 nm or less and which has a particle diameter ($D_{50}$) of 1 μm or more and 4 μm or less, the particle diameter ($D_{50}$) of the large-diameter silver powder being a particle diameter corresponding to 50% of accumulation in a particle size distribution of the large-diameter silver powder, is mixed with a small-diameter silver powder, which has a crystalline size of 50 nm or less and which has a particle diameter ($D_{50}$) of 0.3 μm or more and less than 1 μm, the particle diameter ($D_{50}$) of the small-diameter silver powder being a particle diameter corresponding to 50% of accumulation in a particle size distribution of the small-diameter silver powder, to produce a silver powder, which has a crystalline size of 50 nm or less and which has a pressed density of 6.3 $g/cm^3$ or more.

11 Claims, 12 Drawing Sheets

(51) Int. Cl.
*B22F 1/052* (2022.01)
*B22F 1/054* (2022.01)
*B22F 1/07* (2022.01)

(52) U.S. Cl.
CPC .......... *B22F 1/07* (2022.01); *B22F 2301/255* (2013.01); *B22F 2304/058* (2013.01); *B22F 2304/10* (2013.01)

(56) References Cited

FOREIGN PATENT DOCUMENTS

| | | | |
|---|---|---|---|
| JP | 2018049735 | A | 3/2018 |
| WO | 015194536 | A1 | 5/2017 |

\* cited by examiner

SILVER POWDER AND METHOD FOR PRODUCING SAME

BACKGROUND OF THE INVENTION

The present invention relates generally to a silver powder and a method for producing the same. More specifically, the invention relates to a silver powder which can be suitably used as the material of an electrically conductive paste, and a method for producing the same.

Conventionally, metal powders, such as silver powders, are used as the material of an electrically conductive paste for forming electrodes of solar cells, internal electrodes of multilayer ceramic electronic parts, such as electronic parts using low-temperature co-fired ceramics (LTCC) and multilayer ceramic inductors (MLCI), external electrodes of multilayer ceramic capacitors and/or multilayer ceramic inductors, and so forth.

As such an electrically conductive paste using a metal powder such as a silver powder, there is provided a paste for electrode of a solar cell, the paste containing a first silver powder having a crystalline size of 58 nm or more, a second silver powder having a crystalline size which is different from that of the first silver powder, glass frits and a resin binder (see, e.g., Patent Document 1).

PRIOR ART DOCUMENT(S)

Patent Document(s)

Patent Document 1: JP 2007-194581 (Paragraph Number 0012)

SUMMARY OF THE INVENTION

However, if the paste of Patent Document 1 is fired to form an electrode of a solar cell, there is some possibility that the resistance value of the electrode may be relatively high, so that it is desired to decrease the resistance value of the electrode in order to improve the conversion efficiently of the solar cell. In addition, when the paste of Patent Document 1 is fired to form an electrode of a solar cell, it is required to fire the paste at a temperature of about 600 to 900° C. for about 2 to 15 minutes, so that the firing period of time is so long as to severely damage a substrate on which the electrode is formed.

It is therefore an object of the present invention to eliminate the aforementioned conventional problems and to provide a silver powder, which is able to form an electrically conductive film having a low resistance value even if the period of time for firing an electrically conductive paste is shorter than that for firing conventional electrically conductive pastes when the silver powder is used as the material of the electrically conductive paste, and a method for producing the same.

In order to accomplish the aforementioned object, the inventors have diligently studied and found that it is possible to produce a silver powder which is able to form an electrically conductive film having a low resistance value even if the period of time for firing an electrically conductive paste is shorter than that for firing conventional electrically conductive pastes when the silver powder is used as the material of the electrically conductive paste, if a large-diameter silver powder which has a crystalline size of 50 nm or less and which has a particle diameter ($D_{50}$) of 1 μm or more and 4 μm or less, the crystalline size of the large-diameter silver powder being measured by means of a powder X-ray diffractometer to be calculated, the particle diameter ($D_{50}$) of the large-diameter silver powder being a particle diameter corresponding to 50% of accumulation in a volume-based particle size distribution obtained by measuring the large-diameter silver powder in a wet process by means of a laser diffraction scattering particle size distribution analyzer, is mixed with a small-diameter silver powder which has a crystalline size of 50 nm or less and which has a particle diameter ($D_{50}$) of 0.3 μm or more and less than 1 μm, the crystalline size of the small-diameter silver powder being measured by means of the powder X-ray diffractometer to be calculated, the particle diameter ($D_{50}$) of the small-diameter silver powder being a particle diameter corresponding to 50% of accumulation in a volume-based particle size distribution obtained by measuring the small-diameter silver powder in a wet process by means of the laser diffraction scattering particle size distribution analyzer, to produce a silver powder which has a crystalline size of 50 nm or less and which has a pressed density of 6.3 $g/cm^3$ or more, the crystalline size of the silver powder being measured by means of the powder X-ray diffractometer to be calculated. Thus, the inventors have made the present invention.

According to the present invention, there is provided a method for producing a silver powder, the method comprising the steps of: preparing a large-diameter silver powder which has a crystalline size of 50 nm or less and which has a particle diameter ($D_{50}$) of 1 μm or more and 4 μm or less, the crystalline size of the large-diameter silver powder being measured by means of a powder X-ray diffractometer to be calculated, the particle diameter ($D_{50}$) of the large-diameter silver powder being a particle diameter corresponding to 50% of accumulation in a volume-based particle size distribution obtained by measuring the large-diameter silver powder in a wet process by means of a laser diffraction scattering particle size distribution analyzer; preparing a small-diameter silver powder which has a crystalline size of 50 nm or less and which has a particle diameter ($D_{50}$) of 0.3 μm or more and less than 1 μm, the crystalline size of the small-diameter silver powder being measured by means of the powder X-ray diffractometer to be calculated, the particle diameter ($D_{50}$) of the small-diameter silver powder being a particle diameter corresponding to 50% of accumulation in a volume-based particle size distribution obtained by measuring the small-diameter silver powder in a wet process by means of the laser diffraction scattering particle size distribution analyzer; and mixing the large-diameter silver powder with the small-diameter silver powder to produce a silver powder which has a crystalline size of 50 nm or less and which has a pressed density of 6.3 $g/cm^3$ or more, the crystalline size of the silver powder being measured by means of the powder X-ray diffractometer to be calculated.

In this method for producing a silver powder, the ratio of a particle diameter ($D_{90}$) to a particle diameter ($D_{10}$) is preferably in the range of from 4.0 to 6.5, the particle diameter ($D_{90}$) and the particle diameter ($D_{10}$) being particle diameters corresponding to 90% and 10% of accumulation, respectively, in a volume-based particle size distribution obtained by measuring the produced silver powder in a wet process by means of the laser diffraction scattering particle size distribution analyzer. In addition, a particle diameter ($D_{50}$) corresponding to 50% of accumulation in a volume-based particle size distribution obtained by measuring the produced silver powder in a wet process by means of the laser diffraction scattering particle size distribution analyzer is preferably in the range of from 1.2 μm to 3.0 μm. The measurement in the wet process by means of the laser diffraction scattering particle size distribution analyzer is preferably carried out in a state that the silver powder is dispersed in isopropyl alcohol.

According to the present invention, there is provided a silver powder which has a crystalline size of 50 nm or less and which has a pressed density of 6.3 g/cm$^3$ or more, the crystalline size of the silver powder being measured by means of a powder X-ray diffractometer to be calculated.

In this silver powder, the ratio of a particle diameter ($D_{90}$) to a particle diameter ($D_{10}$) is preferably in the range of from 4.0 to 6.5, the particle diameter ($D_{90}$) and the particle diameter ($D_{10}$) being particle diameters corresponding to 90% and 10% of accumulation, respectively, in a volume-based particle size distribution obtained by measuring the silver powder in a wet process by means of a laser diffraction scattering particle size distribution analyzer. In addition, a particle diameter ($D_{50}$) corresponding to 50% of accumulation in a volume-based particle size distribution obtained by measuring the silver powder in a wet process by means of a laser diffraction scattering particle size distribution analyzer is preferably in the range of from 1.2 µm to 3.0 µm. The measurement in the wet process by means of the laser diffraction scattering particle size distribution analyzer is preferably carried out in a state that the silver powder is dispersed in isopropyl alcohol.

According to the present invention, there is provided an electrically conductive paste wherein the above-described silver powder is dispersed in an organic component.

According to the present invention, it is possible to produce a silver powder which is able to form an electrically conductive film having a low resistance value even if the period of time for firing an electrically conductive paste is shorter than that for firing conventional electrically conductive pastes when the silver powder is used as the material of the electrically conductive paste.

DETAILED DESCRIPTION

Figure 1A:
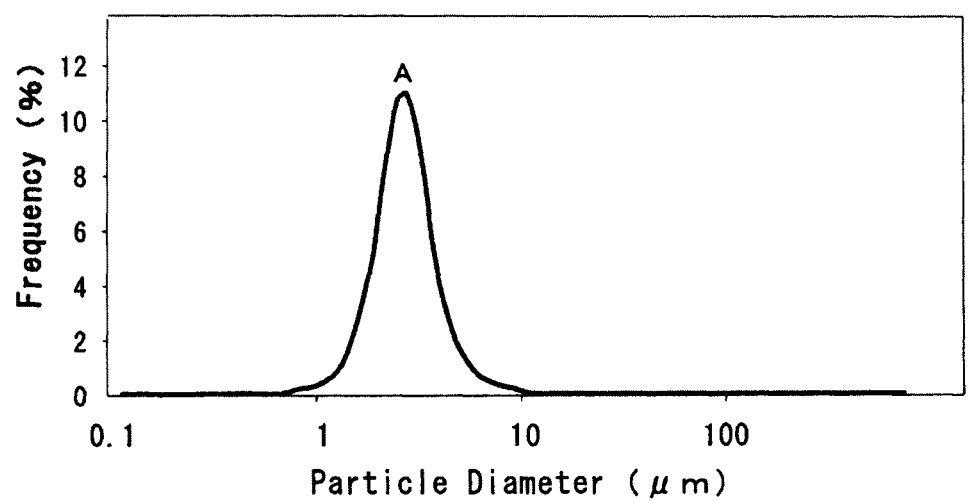
FIG. 1A is a graph showing a volume-based particle size distribution obtained by measuring a silver powder 1, which is used in examples, in a wet process by means of a laser diffraction scattering particle size analyzer.

In the preferred embodiment of a method for producing a silver powder according to the present invention, a large-diameter silver powder which has a crystalline size of 50 nm (preferably 42 nm) or less and which has a particle diameter ($D_{50}$) of 1 µm or more and 4 µm or less, the crystalline size of the large-diameter silver powder being measured by means of a powder X-ray diffractometer to be calculated, the particle diameter ($D_{50}$) of the large-diameter silver powder being a particle diameter corresponding to 50% of accumulation in a volume-based particle size distribution obtained by measuring the large-diameter silver powder in a wet process by means of a laser diffraction scattering particle size distribution analyzer is mixed with a small-diameter silver powder which has a crystalline size of 50 nm (preferably 42 nm) or less and which has a particle diameter ($D_{50}$) of 0.3 µm or more and less than 1 µm, the crystalline size of the small-diameter silver powder being measured by means of the powder X-ray diffractometer to be calculated, the particle diameter ($D_{50}$) of the small-diameter silver powder being a particle diameter corresponding to 50% of accumulation in a volume-based particle size distribution obtained by measuring the small-diameter silver powder in a wet process by means of the laser diffraction scattering particle size distribution analyzer, to produce a silver powder which has a crystalline size of 50 nm or less and which has a pressed density of 6.3 g/cm$^3$ or more, the crystalline size of the silver powder being measured by means of the powder X-ray diffractometer to be calculated.

In the method for producing the silver powder in this preferred embodiment, the ratio of a particle diameter ($D_{90}$) to a particle diameter ($D_{10}$) is preferably in the range of from 4.0 to 6.5, the particle diameter ($D_{90}$) and the particle diameter ($D_{10}$) being particle diameters corresponding to 90% and 10% of accumulation, respectively, in a volume-based particle size distribution obtained by measuring the produced silver powder in a wet process by means of the laser diffraction scattering particle size distribution analyzer. In addition, a particle diameter ($D_{50}$) corresponding to 50% of accumulation in a volume-based particle size distribution obtained by measuring the produced silver powder in a wet process by means of the laser diffraction scattering particle size distribution analyzer is preferably in the range of from 1.2 µm to 3.0 µm and more preferably in the range of from 1.5 µm to 2.8 µm. The measurement in the wet process by means of the laser diffraction scattering particle size distribution analyzer is preferably carried out in a state that the silver powder is dispersed in isopropyl alcohol.

The preferred embodiment of a silver powder according to the present invention has a crystalline size of 50 nm or less and a pressed density of 6.3 g/cm³ or more, the crystalline size of the silver powder being measured by means of a powder X-ray diffractometer to be calculated.

In the silver powder in this preferred embodiment, the ratio of a particle diameter ($D_{90}$) to a particle diameter ($D_{10}$) is preferably in the range of from 4.0 to 6.5, the particle diameter ($D_{90}$) and the particle diameter ($D_{10}$) being particle diameters corresponding to 90% and 10% of accumulation, respectively, in a volume-based particle size distribution obtained by measuring the silver powder in a wet process by means of a laser diffraction scattering particle size distribution analyzer. In addition, a particle diameter ($D_{50}$) corresponding to 50% of accumulation in a volume-based particle size distribution obtained by measuring the silver powder in a wet process by means of a laser diffraction scattering particle size distribution analyzer is preferably in the range of from 1.2 μm to 3.0 μm and more preferably in the range of from 1.5 μm to 2.8 μm. Furthermore, the weight ratio (large-diameter silver powder:silver-diameter silver powder) of the large-diameter silver powder to the small-diameter silver powder in the silver powder (mixed silver powder) is preferably 95:5 to 50:50 and more preferably 90:10 to 65:35. The measurement in the wet process by means of the laser diffraction scattering particle size distribution analyzer is preferably carried out in a state that the silver powder is dispersed in isopropyl alcohol.

When the preferred embodiment of a silver powder according to the present invention is used as the material of an electrically conductive paste (such as a baked type electrically conductive paste), the electrically conductive paste contains the silver powder, and an organic solvent (such as saturated aliphatic hydrocarbons, unsaturated aliphatic hydrocarbons, ketones, aromatic hydrocarbons, glycol ethers, esters or alcohols), as components thereof. If necessary, the electrically conductive paste may contain a vehicle, which contains a binder resin (such as ethyl cellulose or acrylic resin) dissolved in an organic solvent, glass frits, inorganic oxides, dispersing agents, and so forth, as components thereof.

The content of the silver powder in the electrically conductive paste is preferably 5 to 98% by weight and more preferably 70 to 95% by weight, from the points of view of the conductivity and producing costs of the electrically conductive paste. The content of the binder resin in the electrically conductive paste is preferably 0.1 to 10% by weight and more preferably 0.1 to 6% by weight, from the points of view of the dispersibility of the silver powder in the electrically conductive paste and of the conductivity of the electrically conductive paste. Two kinds or more of the vehicles, each of which contains the binder resin dissolved in the organic solvent, may be mixed to be used. The content of the glass frits in the electrically conductive paste is preferably 0.1 to 20% by weight and more preferably 0.1 to 10% by weight, from the points of view of the procurance of the conduction between an electrode and a substrate due to fire through and of the conductivity of the electrode, after the electrically conductive paste is sintered in a case where the electrically conductive paste is applied on the substrate to form the electrode. Two kinds or more of the glass frits may be mixed to be used. The content of the organic solvent in the electrically conductive paste (the total content of the organic solvents containing the organic solvent of the vehicle when the electrical conductive paste contains the vehicle) is preferably in the range of from 0.8% by weight to 20% by weight and more preferably in the range of from 0.8% by weight to 15% by weight, from the points of view of the dispersibility of the silver powder in the electrically conductive paste and of the appropriate viscosity of the electrically conductive paste. Two kinds or more of the organic solvents may be mixed to be used.

For example, such an electrically conductive paste can be prepared by putting components, the weights of which are measured, into a predetermined vessel to preliminarily knead the components by means of a Raikai mixer (grinder), an all-purpose mixer, a kneader or the like, and thereafter, kneading them by means of a three-roll mill. Thereafter, an organic solvent may be added thereto to adjust the viscosity thereof, if necessary. After only the glass frits, the inorganic oxide and the vehicle are kneaded to decrease the particle size thereof, the silver powder may be finally added thereto to be kneaded.

EXAMPLES

Examples of a silver powder and a method for producing the same according to the present invention will be described below in detail.

Example 1

Figure 1B:
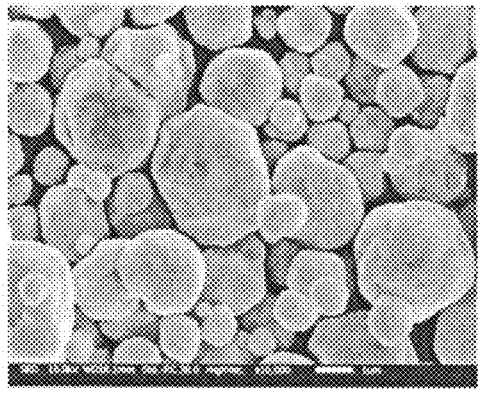
FIG. 1B is a scanning electron micrograph (SEM image) of the silver powder 1 which is used in examples and which is observed at a magnification of 10,000.

As the silver powder 1, a commercially available silver powder (AG-5-54F produced by DOWA Hightech Co., Ltd.) was prepared. Then, 10.1 g of this silver powder was added to 40 mL of isopropyl alcohol (IPA) to be dispersed for 2 minutes by means of an ultrasonic homogenizer (US-150T produced by NISSEI Corporation, 19.5 kHz) having a chip distal end diameter of 18 mm to obtain a sample. With respect to this sample, the volume-based particle size distribution of the silver powder 1 (based on a wet laser diffraction scattering particle size distribution measurement) was obtained in a total reflection mode by means of a laser diffraction scattering particle size distribution analyzer (MICROTRAC MT3300 EXII produced by Microtrac BEL Corporation). As a result, the particle diameter ($D_{10}$) corresponding to 10% of accumulation was 1.7 μm, the particle diameter ($D_{50}$) corresponding to 50% of accumulation was 2.5 μm, and the particle diameter ($D_{90}$) corresponding to 90% of accumulation was 3.9 μm, so that $D_{90}/D_{10}$ was 2.3. Assuming that the particle diameter having the maximum frequency was a peak particle diameter A, it was 2.8 μm at a frequency of 11.2%. The measured results are shown in FIG. 1A. The scanning electron micrograph (SEM image) of the silver powder (silver powder 1) observed at a magnification of 10,000 is shown in FIG. 1B.

With respect to the above-described silver powder 1, a powder X-ray diffraction analyzer (RAD-rB produced by RIGAKU Corporation) was used for measuring X-ray diffraction (XRD). From an X-ray diffraction pattern obtained by the measurement of X-ray diffraction, the crystalline diameter (Dx) of the silver powder 1 was obtained by the Scherrer equation ($Dhkl=K\lambda/(\cos\theta)$). In this equation, Dhkl denotes a crystallite diameter (the size of a crystallite in a direction perpendicular to hkl) (angstrom), and λ denotes the wavelength (angstrom) of measuring X-rays (1.5405 angstrom when a Cu target is used), β denoting the broadening (rad) (expressed by a half-power band width) of diffracted rays based on the size of the crystallite, θ denoting a Bragg angle (rad) of the angle of diffraction (the Bragg angle being an angle when the angle of incidence is equal to the angle of reflection and which uses the angle at a peak top) and K denoting the Scherrer constant (K=0.94 when a half-power band width is used as β although it varies in accordance with the definition of D and β). Furthermore, peak data on (200) plane were used for carrying out calculation. As a result, the crystallite diameter ($D_x$) of the silver powder 1 was 390 angstrom (39.0 nm).

After a cylindrical chamber having an inside diameter of 1.91 cmϕ of a dry automatic densimeter (AccuPyc 111340 produced by Micromeritics Instrument Corporation) was filled with 20 g of the above-described silver powder (silver powder 1), the density of the silver powder was measured as a pressed density when the silver powder was pressed at a pressure of 40 N/cm². As a result, the pressed density was 6.2 g/cm³.

Figure 2A:
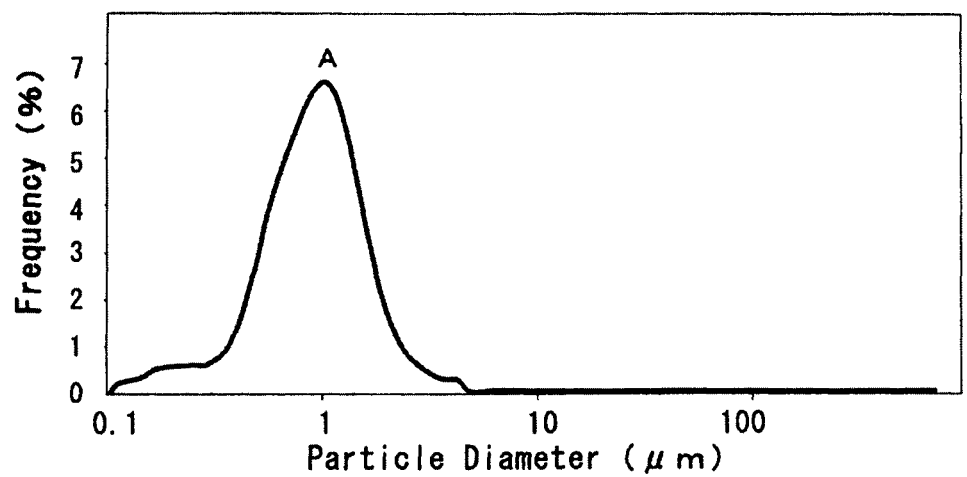
FIG. 2A is a graph showing a volume-based particle size distribution obtained by measuring a silver powder 2, which is used in examples, in a wet process by means of the laser diffraction scattering particle size analyzer.
Figure 2B:
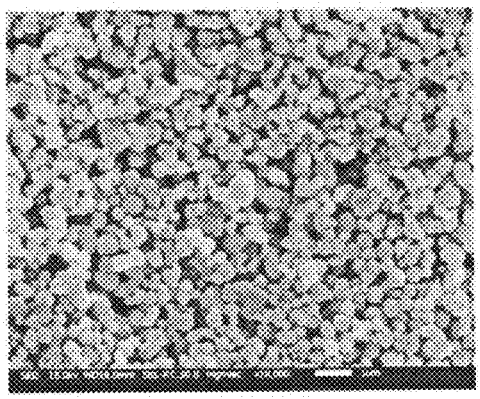
FIG. 2B is a SEM image of the silver powder 2 which is used in examples and which is observed at a magnification of 10,000.

As the silver powder 2, another commercially available silver powder (AG-2-1C produced by DOWA Hightech Co., Ltd.) was prepared. The volume-based particle size distribution of this silver powder 2 (based on a wet laser diffraction scattering particle size distribution measurement) was obtained by the same method as the above-described method. As a result, the particle diameter ($D_{10}$) corresponding to 10% of accumulation was 0.4 μm, the particle diameter ($D_{50}$) corresponding to 50% of accumulation was 0.9 μm, and the particle diameter ($D_{90}$) corresponding to 90% of accumulation was 1.7 μm, so that $D_{90}/D_{10}$ was 4.25. Assuming that the particle diameter having the maximum frequency was a peak particle diameter A, it was 1.1 μm at a frequency of 6.6%. The measured results are shown in FIG. 2A. The SEM image of the silver powder (silver powder 2) observed at a magnification of 10,000 is shown in FIG. 2B.

The crystalline diameter (Dx) of the above-described silver powder 2 was calculated by the same method as the above-described method. As a result, the crystalline diameter (Dx) was 383 angstrom (38.3 nm).

Then, 42.5 g (85% by weight) of the silver powder 1 and 7.5 g (15% by weight) of the silver powder 2 were put into an electrically operated coffee mill (ECG-62 produced by MELITTA JAPAN LIMITED) to be mixed for 4 minutes.

Figure 3A:
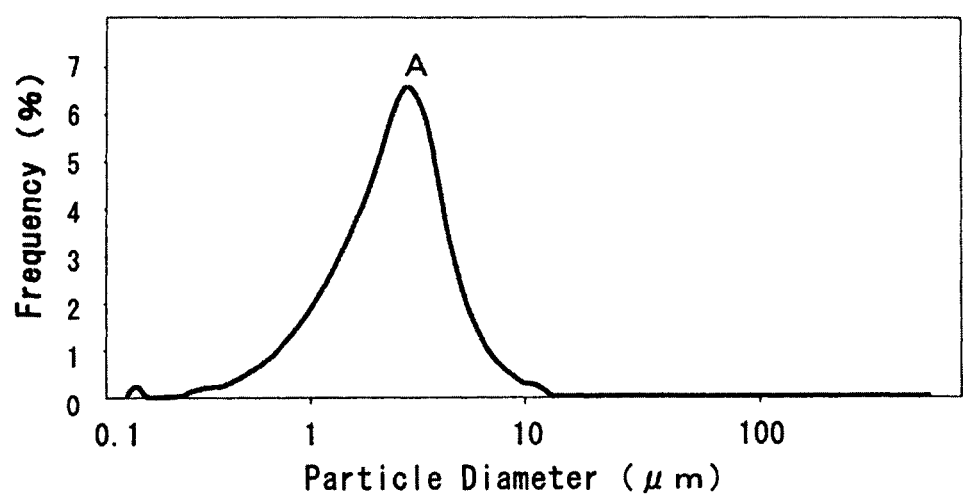
FIG. 3A is a graph showing a volume-based particle size distribution obtained by measuring a silver powder, which is obtained in Example 1, in a wet process by means of the laser diffraction scattering particle size analyzer.
Figure 3B:
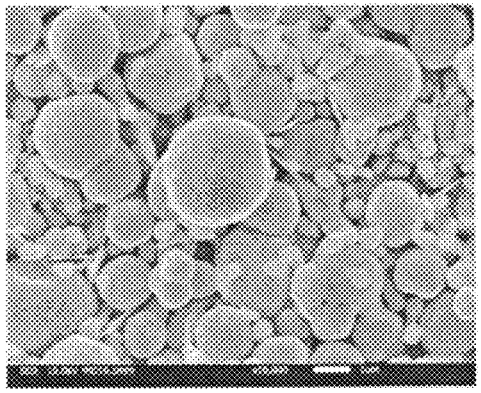
FIG. 3B is a SEM image of the silver powder which is obtained in Example 1 and which is observed at a magnification of 10,000.

With respect to a silver powder (mixed silver powder) thus obtained, the volume-based particle size distribution of the silver powder (based on a wet laser diffraction scattering particle size distribution measurement) was obtained by the same method as the above-described method. As a result, the particle diameter ($D_{10}$) corresponding to 10% of accumulation was 0.8 μm, the particle diameter ($D_{50}$) corresponding to 50% of accumulation was 2.1 μm, and the particle diameter ($D_{90}$) corresponding to 90% of accumulation was 4.1 μm, so that $D_{90}/D_{10}$ was 5.1. Assuming that the particle diameter having the maximum frequency was a peak particle diameter A, it was 2.5 μm at a frequency of 6.5%. The measured results are shown in FIG. 3A. The SEM image of this silver powder (mixed silver powder) observed at a magnification of 10,000 is shown in FIG. 3B.

The crystalline diameter (Dx) of the silver powder (mixed silver powder) thus obtained was calculated by the same method as the above-described method. As a result, the crystalline diameter (Dx) was 456 angstrom (45.6 nm).

After the cylindrical chamber having an inside diameter of 1.91 cmϕ of the dry automatic densimeter (AccuPyc 111340 produced by Micromeritics Instrument Corporation) was filled with 20 g of the obtained silver powder (mixed silver powder), the density of the silver powder was measured as a pressed density when the silver powder was pressed at a pressure of 40 N/cm². As a result, the pressed density was 7.1 g/cm³.

Then, 89.8% by weight of the obtained silver powder (mixed silver powder), 2.0% by weight of glass frits (FSGCO2 produced by Nippon Glass Co., Ltd.), 0.4% by weight of oleic acid serving as a dispersing agent, 0.2% by weight of a mixture of ethyl cellulose and hydroxypropyl cellulose serving as a resin, 6.2% by weight of a mixture of terpineol, Texanol and butyl carbitol acetate serving as a solvent, 1.1% by weight of water-added castor oil serving as a thixotropic agent, and 0.4% by weight of dimethylpolysiloxane serving as a line shape holding agent were kneaded by means of a propellerless planetary centrifugal vacuum degassing mixer (AR250 produced by Thinky Corporation), and then, by means of a three-roll mill (80S produced by EXAKT Inc.). Thereafter, the kneaded mixture thus obtained was caused to pass through a mesh of 500 μm to obtain an electrical conductive paste.

Then, after an aluminum paste (ALSOLAR 14-7021 produced by Toyo Aluminum K.K.) was printed on the backside of a silicon substrate (100 Ω/square) for solar cell in the shape of a rectangular pattern of 154 mm square by means of a screen printing machine (MT-320T produced by Micro-tech Co., Ltd.), it was dried at 200° C. for 10 minutes by means of a hot air type dryer. In addition, after the above-described electrically conductive paste was printed on the surface (upper side) of the silicon wafer in the shape of 110 finger electrodes, each having a width of 27 μm, and of four busbar electrodes, each having a width of 1.7 mm, by means of the screen printing machine (MT-320T produced by Micro-tech Co., Ltd.), it was dried at 200° C. for 10 minutes by means of the hot air type dryer. Then, it was fired at a peak temperature of 770° C. for an in-out time of 21 seconds in the atmosphere by means of a fast firing IR furnace (Fast Firing Test Four-Chamber Furnace produced by NGK Insulators Ltd.), to form an electrical conductive film to produce a solar cell.

Then, the above-described solar cell was irradiated with pseudo sunlight having a light irradiation energy of 100 mW/cm² by means of a xenon lamp of a solar simulator (produced by Wacom Electric Co., Ltd.). As a result, when a short-circuit was established between the output terminals of the solar cell, the current (short circuit current) Isc flowing between the output terminals was 8.78 A. When the output terminals of the solar cell were open, the voltage (open circuit voltage) Voc between the output terminals was 0.63 V. The current density Jsc (the short circuit current Isc per 1 cm²) was $3.3\times10^{-2}$ A/cm². The value (fill factor) FF (=Pmax/Voc·Isc) obtained by dividing the maximum output Pmax (=Imax·Vmax) by a product of the open circuit voltage Voc and the current density Jsc was 79.66. The conversion efficiency (powder generation efficiency) Eff (the value obtained by multiplying 100 by a value obtained by dividing the maximum output Pmax by the amount of irradiation light (W) (per 1 cm²)) was a good value of 18.27%. The series resistance Rs was $6.4\times10^{-3}$ Ω/square.

Example 2

Figure 4A:
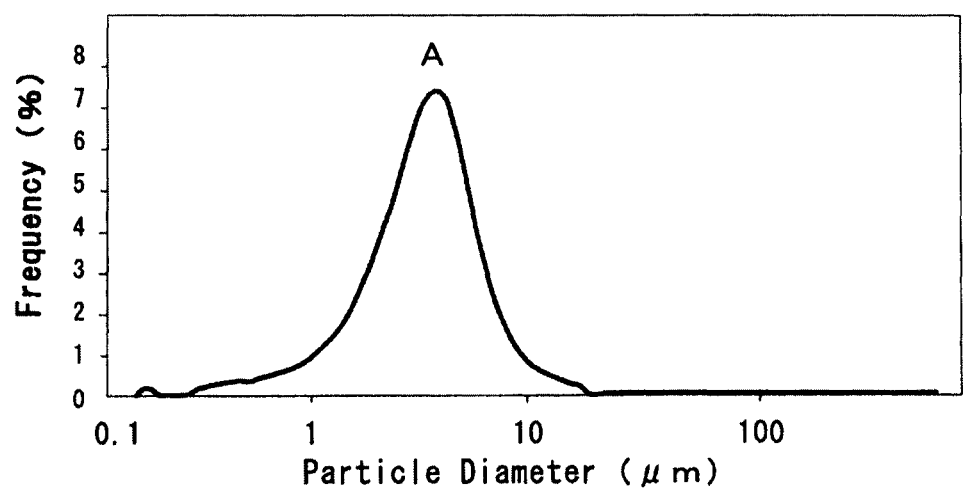
FIG. 4A is a graph showing a volume-based particle size distribution obtained by measuring a silver powder, which is obtained in Example 2, in a wet process by means of the laser diffraction scattering particle size analyzer.
Figure 4B:
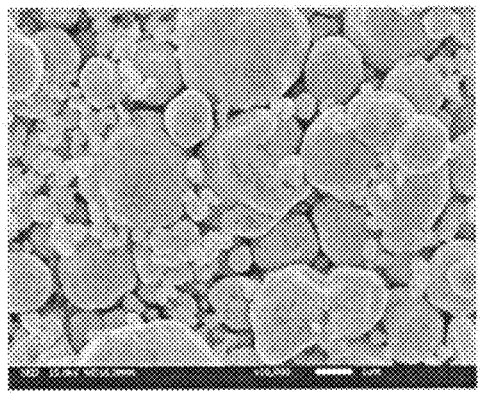
FIG. 4B is a SEM image of the silver powder which is obtained in Example 2 and which is observed at a magnification of 10,000.

A silver powder (mixed silver powder) was obtained by the same method as that in Example 1, except that 5525 g (85% by weight) of the silver powder 1 and 975 g (15% by weight) of the silver powder 2 were put into a V-shape rotating mixer (DV-1-10 produced by DALTON Co., Ltd.) to be mixed at 60 rpm for 360 minutes. With respect to the silver powder (mixed silver powder) thus obtained, the volume-based particle size distribution of the silver powder (based on a wet laser diffraction particle size distribution measurement) was obtained by the same method as that in Example 1. As a result, the particle diameter ($D_{10}$) corresponding to 10% of accumulation was 0.9 µm, the particle diameter ($D_{50}$) corresponding to 50% of accumulation was 2.2 µm, and the particle diameter ($D_{90}$) corresponding to 90% of accumulation was 4.0 µm, so that $D_{90}/D_{10}$ was 4.4. Assuming that the particle diameter having the maximum frequency was a peak particle diameter A, it was 2.5 µm at a frequency of 7.1%. The measured results are shown in FIG. 4A. The SEM image of the silver powder (mixed silver powder) observed at a magnification of 10,000 is shown in FIG. 4B.

With respect to the silver powder (mixed silver powder) thus obtained, the crystalline diameter (Dx) was calculated by the same method as that in Example 1, and the pressed density was measured by the same method as that in Example 1. As a result, the crystalline diameter (Dx) was 432 angstrom (43.2 nm), and the pressed density was 6.6 g/cm$^3$.

After the obtained silver powder (mixed silver powder) was used for obtaining an electrical conductive paste to produce a solar cell by the same method as that in Example 1, the series resistance value thereof was obtained by the same method as that in Example 1. As a result, the series resistance was $6.4 \times 10^{-3}$ Ω/square.

Comparative Example 1

After 3670.1 g of an aqueous silver nitrate solution having a silver concentration of 1.4% by weight was put into a glass beaker, 161.8 g of an ammonia water having a concentration of 28% by weight (an equivalent of ammonia of 2.67 moles with respect to 1 mole of silver) was added to the aqueous silver nitrate solution. In 30 seconds after the ammonia water was added, 7.5 g of an aqueous sodium hydroxide solution having a concentration of 20% by weight was added thereto to obtain an aqueous silver amine complex solution. This aqueous silver amine complex solution was stirred for 3 minutes, and 357.6 g of an aqueous formaldehyde solution (obtained by diluting formalin with water) having a concentration of 21.0% by weight (an equivalent of 12.4 moles with respect to 1 mole of silver) was mixed with the stirred aqueous silver amine complex solution. In 15 seconds after the mixing was started, 6.01 g of an ethanol solution containing 1.55% by weight of stearic acid (serving as a reducing agent) was added thereto, and then, the reducing reaction was completed to obtain a slurry containing silver particles. This slurry was filtered, and the solid thus obtained was washed with water until the electrical conductivity of the filtrate was 0.2 mS. Then, after the washed solid was dried at 73° C. for 10 hours by means of a vacuum drier, the dried powder thus obtained was put into a pulverizing machine (SK-M10 produced by Kyoritsu Riko Co., Ltd.), and the pulverization for 30 seconds was repeated twice to obtain a silver powder.

Figure 5A:
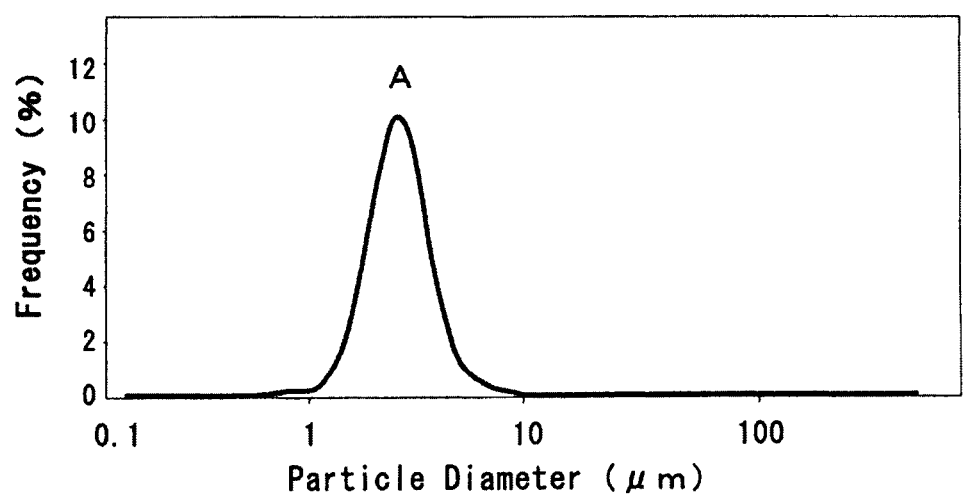
FIG. 5A is a graph showing a volume-based particle size distribution obtained by measuring a silver powder, which is obtained in Comparative Example 1, in a wet process by means of the laser diffraction scattering particle size analyzer.
Figure 5B:
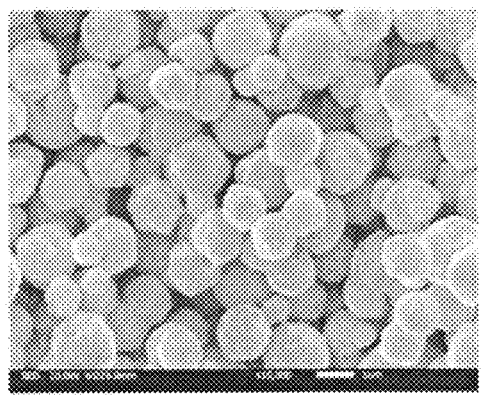
FIG. 5B is a SEM image of the silver powder which is obtained in Comparative Example 1 and which is observed at a magnification of 10,000.

With respect to the silver powder thus obtained, the volume-based particle size distribution of the silver powder (based on a wet laser diffraction scattering particle size distribution measurement) was obtained by the same method as that in Example 1. As a result, the particle diameter ($D_{10}$) corresponding to 10% of accumulation was 1.1 µm, the particle diameter ($D_{50}$) corresponding to 50% of accumulation was 1.8 µm, and the particle diameter ($D_{90}$) corresponding to 90% of accumulation was 2.8 µm, so that $D_{90}/D_{10}$ was 2.5. Assuming that the particle diameter having the maximum frequency was a peak particle diameter A, it was 2.1 µm at a frequency of 10.2%. The measured results are shown in FIG. 5A. The SEM image of the silver powder observed at a magnification of 10,000 is shown in FIG. 5B.

With respect to the silver powder thus obtained, the crystalline diameter (Dx) was calculated by the same method as that in Example 1, and the pressed density was measured by the same method as that in Example 1. As a result, the crystalline diameter (Dx) was 332 angstrom (33.2 nm), and the pressed density was 5.5 g/cm$^3$.

After the obtained silver powder was used for obtaining an electrical conductive paste to produce a solar cell by the same method as that in Example 1, the series resistance value thereof was obtained by the same method as that in Example 1. As a result, the series resistance was $6.8 \times 10^{-3}$ Ω/square.

Comparative Example 2

A commercially available spherical silver powder produced by an atomizing method (Atomized Silver Powder AO-PCGT-25 produced by DOWA Electrics Materials Co., Ltd.) was prepared. The volume-based particle size distribution of this silver powder (based on a wet laser diffraction scattering particle size distribution measurement) was obtained by the same method as that in Example 1. As a result, the particle diameter ($D_{10}$) corresponding to 10% of accumulation was 1.5 µm, the particle diameter ($D_{50}$) corresponding to 50% of accumulation was 2.8 µm, and the particle diameter ($D_{90}$) corresponding to 90% of accumulation was 4.8 µm, so that $D_{90}/D_{10}$ was 3.2. With respect to this silver powder, the crystalline diameter (Dx) was calculated by the same method as that in Example 1. As a result, the crystalline diameter (Dx) was 575 angstrom (57.5 nm).

Then, 45.2 g of this silver powder and 7.5 g of the silver powder 2 (AG-2-1C produced by DOWA Hightech Co., Ltd.) in Example 1 were put into an electrically operated coffee mill (ECG-62 produced by MELITTA JAPAN LIMITED) to be mixed for 4 minutes.

Figure 6:
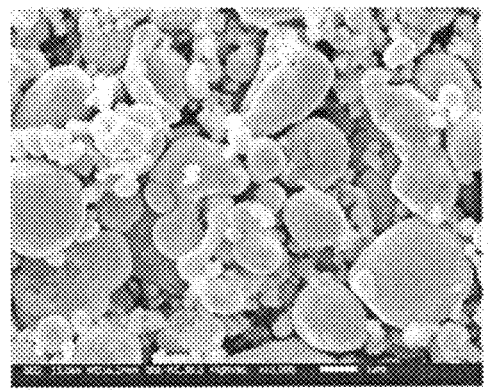
FIG. 6 is a SEM image of a silver powder which is obtained in Comparative Example 2 and which is observed at a magnification of 10,000.

With respect to the silver powder (mixed silver powder) thus obtained, the volume-based particle size distribution of the silver powder (based on a wet laser diffraction scattering particle size distribution measurement) was obtained by the same method as that in Example 1. As a result, the particle diameter ($D_{10}$) corresponding to 10% of accumulation was 0.9 µm, the particle diameter ($D_{50}$) corresponding to 50% of accumulation was 2.5 µm, and the particle diameter ($D_{90}$) corresponding to 90% of accumulation was 4.6 µm, so that $D_{90}/D_{10}$ was 5.1. Furthermore, the SEM image of this silver powder (mixed silver powder) observed at a magnification of 10,000 is shown in FIG. 6.

With respect to the above-described silver powder (mixed silver powder), the crystalline diameter (Dx) was calculated by the same method as that in Example 1, and the pressed density was measured by the same method as that in Example 1. As a result, the crystalline diameter (Dx) was 554 angstrom (55.4 nm), and the pressed density was 6.6 g/cm$^3$.

After the obtained silver powder was used for obtaining an electrical conductive paste to produce a solar cell by the same method as that in Example 1, the series resistance value thereof was obtained by the same method as that in Example 1. As a result, the series resistance was $7.3 \times 10^{-3}$ Ω/square.

Comparative Example 3

After the silver powder 1 (AG-5-54F produced by DOWA Hightech Co., Ltd.) in Example 1 was used for obtaining an electrical conductive paste to produce a solar cell by the same method as that in Example 1, the series resistance value thereof was obtained by the same method as that in Example 1. As a result, the series resistance was $6.8 \times 10^{-3}$ Ω/square. Furthermore, the pressed density of the silver powder 1 was measured by the same method as that in Example 1. As a result, the pressed density was 6.2 g/cm³.

Comparative Example 4

After the silver powder 2 (AG-2-1C produced by DOWA Hightech Co., Ltd.) in Example 1 was used for obtaining an electrical conductive paste to produce a solar cell by the same method as that in Example 1, the series resistance value thereof was obtained by the same method as that in Example 1. As a result, the series resistance was $7.1 \times 10^{-3}$ Ω/square. Furthermore, the pressed density of the silver powder 1 was measured by the same method as that in Example 1. As a result, the pressed density was 5.3 g/cm³.

The characteristics of the silver powders in these examples and comparative examples are shown in Tables 1-2.

TABLE 1

| | Silver Powder 1 | | | | Silver Powder 2 | | | |
|---|---|---|---|---|---|---|---|---|
| | Particle Size Distribution (μm) | | | Crystalline Size | Particle Size Distribution (μm) | | | Crystalline Size |
| | $D_{10}$ | $D_{50}$ | $D_{90}$ | $D_{90}/D_{10}$ | $D_X$ (nm) | $D_{10}$ | $D_{50}$ | $D_{90}$ | $D_{90}/D_{10}$ | $D_X$ (nm) |
| Ex. 1 | 1.7 | 2.5 | 3.9 | 2.3 | 39.0 | 0.4 | 0.9 | 1.7 | 4.25 | 38.3 |
| Ex. 2 | 1.7 | 2.5 | 3.9 | 2.3 | 39.0 | 0.4 | 0.9 | 1.7 | 4.25 | 38.3 |
| Comp. 2 | 1.5 | 2.8 | 4.8 | 3.2 | 57.5 | 0.4 | 0.9 | 1.7 | 4.25 | 38.3 |

TABLE 2

| | Silver Powder | | | | | | |
|---|---|---|---|---|---|---|---|
| | Particle Size Distribution (μm) | | | | Crystalline Size | Pressed Density | Series Resistance |
| | $D_{10}$ | $D_{50}$ | $D_{90}$ | $D_{90}/D_{10}$ | $D_X$ (nm) | (g/cm³) | (Ω) |
| Ex. 1 | 0.8 | 2.1 | 4.1 | 5.1 | 45.6 | 7.1 | $6.4 \times 10^{-3}$ |
| Ex. 2 | 0.9 | 2.2 | 4.0 | 4.4 | 43.2 | 6.6 | $6.4 \times 10^{-3}$ |
| Comp. 1 | 1.1 | 1.8 | 2.8 | 2.5 | 33.2 | 5.5 | $6.8 \times 10^{-3}$ |
| Comp. 2 | 0.9 | 2.5 | 4.6 | 5.1 | 55.4 | 6.6 | $7.3 \times 10^{-3}$ |
| Comp. 3 | 1.7 | 2.5 | 3.9 | 2.3 | 39.0 | 6.2 | $6.8 \times 10^{-3}$ |

Figure 7:
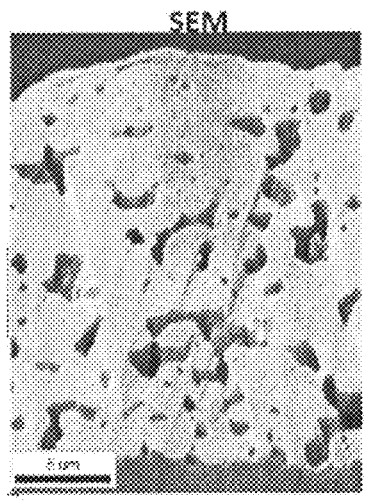
FIG. 7 is a scanning electron micrograph (SEM image) of a cross-section of an electrically conductive film after an electrically conductive paste obtained in Example 1 is fired.
Figure 8:
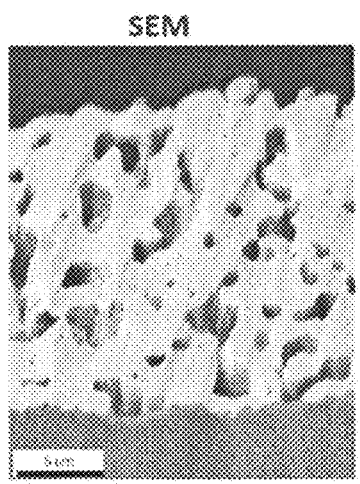
FIG. 8 is a SEM image of a cross-section of an electrically conductive film after an electrically conductive paste obtained in Example 2 is fired.
Figure 9:
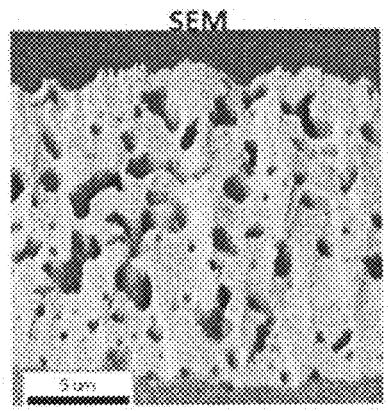
FIG. 9 is a SEM image of a cross-section of an electrically conductive film after an electrically conductive paste obtained in Comparative Example 1 is fired.

Each of the solar cells obtained in Examples 1-2 and Comparative Example 1 was broken in directions perpendicular to the surface thereof, and the milling of the cross-section thereof was carried out for 3 hours by intermittently repeating the turning ON and OFF (ON for 20 seconds and OFF for 10 seconds) at a beam current of 180 μA by means of an ion milling apparatus (ArBlade 500 produced by Hitachi High-Tech Science Corporation). The scanning electron micrograph (SEM image) of the milled cross-section of the electrically conductive film of each of the solar cells is shown in FIGS. 7-9, respectively.

It is possible to obtain an electrically conductive film having high conductivity if a silver powder according to the present invention is utilized as the material of a baked type electrically conductive paste in order to form electrodes of solar cells, internal electrodes of multilayer ceramic electronic parts, such as electronic parts using low-temperature co-fired ceramics (LTCC) and multilayer ceramic inductors, external electrodes of multilayer ceramic capacitors and/or multilayer ceramic inductors, and so forth.

The invention claimed is:

1. A silver powder which has a crystalline size of 50 nm or less and which has a pressed density of 6.3 g/cm³ or more, the crystalline size of the silver powder being measured by means of a powder X-ray diffractometer to be calculated, wherein a ratio of a particle diameter ($D_{90}$) to a particle diameter ($D_{10}$) is in the range of from 4.0 to 6.5, the particle diameter ($D_{90}$) and the particle diameter ($D_{10}$) being particle diameters corresponding to 90% and 10% of accumulation, respectively, in a volume-based particle size distribution obtained by measuring the silver powder in a wet process by means of a laser diffraction scattering particle size distribution analyzer.

2. A silver powder as set forth in claim 1, wherein the measurement in the wet process by means of the laser diffraction scattering particle size distribution analyzer is carried out in a state that the silver powder is dispersed in isopropyl alcohol.

3. A silver powder s set forth in claim 1, wherein a particle diameter ($D_{50}$) corresponding to 50% of accumulation in a volume-based particle size distribution obtained by measuring the silver powder in a wet process by means of a laser diffraction scattering particle size distribution analyzer is in the range of from 1.2 μm to 3.0 μm.

4. A silver powder as set forth in claim 3, wherein the measurement in the wet process by means of the laser diffraction scattering particle size distribution analyzer is carried out in a state that the silver powder is dispersed in isopropyl alcohol.

5. A silver powder which has a crystalline size of 50 nm or less and which has a pressed density of 6.3 g/cm³ or more, the crystalline size of the silver powder being measured by means of a powder X-ray diffractometer to be calculated, wherein a particle diameter ($D_{50}$) corresponding to 50% of accumulation in a volume-based particle size distribution obtained by measuring the silver powder in a wet process by means of a laser diffraction scattering particle size distribution analyzer is in the range of from 1.2 μm to 3.0 μm.

6. A silver powder as set forth in claim 5, wherein the measurement in the wet process by means of the laser diffraction scattering particle size distribution analyzer is carried out in a state that the silver powder is dispersed in isopropyl alcohol.

7. A method for producing a silver powder, the method comprising the steps of:
   preparing a large-diameter silver powder which has a crystalline size of 50 nm or less and which has a particle diameter ($D_{50}$) of 1 μm or more and 4 μm or less, the crystalline size of the large-diameter silver powder being measured by means of a powder X-ray diffractometer to be calculated, the particle diameter ($D_{50}$) of the large-diameter silver powder being a particle diameter corresponding to 50% of accumulation in a volume-based particle size distribution obtained by measuring the large-diameter silver powder in a wet process by means of a laser diffraction scattering particle size distribution analyzer;
   preparing a small-diameter silver powder which has a crystalline size of 50 nm or less and which has a particle diameter ($D_{50}$) of 0.3 μm or more and less than 1 μm, the crystalline size of the small-diameter silver powder being measured by means of the powder X-ray diffractometer to be calculated, the particle diameter ($D_{50}$) of the small-diameter silver powder being a particle diameter corresponding to 50% of accumulation in a volume-based particle size distribution obtained by measuring the small-diameter silver powder in a wet process by means of the laser diffraction scattering particle size distribution analyzer; and mixing the large-diameter silver powder with the small-diameter silver powder to produce a silver powder which has a crystalline size of 50 nm or less and which has a pressed density of 6.3 g/cm³ or more, the crystalline size of the silver powder being measured by means of the powder X-ray diffractometer to be calculated, and wherein a ratio of a particle diameter ($D_{90}$) to a particle diameter ($D_{10}$) is in the range of from 4.0 to 6.5, the particle diameter ($D_{90}$) and the particle diameter ($D_{10}$) being particle diameters corresponding to 90% and 10% of accumulation, respectively, in a volume-based particle size distribution obtained by measuring the silver powder in a wet process by means of a laser diffraction scattering particle size distribution analyzer.

8. A method for producing a silver powder as set forth in claim 7, wherein a ratio of a particle diameter ($D_{90}$) to a particle diameter ($D_{10}$) is in the range of from 4.0 to 6.5, the particle diameter ($D_{90}$) and the particle diameter ($D_{10}$) being particle diameters corresponding to 90 % and 10 % of accumulation, respectively, in a volume-based particle size distribution obtained by measuring the produced silver powder in a wet process by means of the laser diffraction scattering particle size distribution analyzer.

9. A method for producing a silver powder as set forth in claim 7, wherein a particle diameter ($D_{50}$) corresponding to 50 % of accumulation in a volume-based particle size distribution obtained by measuring the produced silver powder in a wet process by means of the laser diffraction scattering particle size distribution analyzer is in the range of from 1.2 µm to 3.0 µm.

10. A method for producing a siler powder as set forth in claim 7, wherein the measurement in the wet process by means of the laser diffraction scattering particle size distribution analyzer is carried out in a state that the silver powder is dispersed in isopropyl alcohol.

11. An electrically conductive paste wherein a silver powder as set forth in claim 1 is dispersed in an organic component.

\* \* \* \* \*